Feb. 1, 1949.
H. L. OLIVER ET AL
2,460,526
RELEASABLE CASTING WEIGHT
Filed Nov. 20, 1946
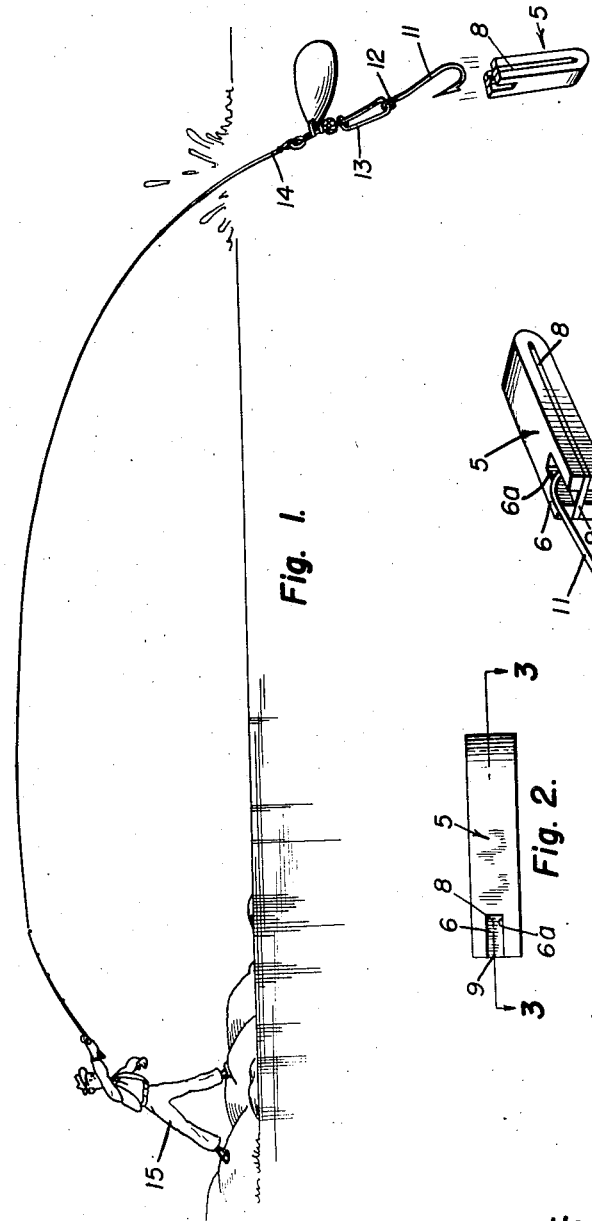
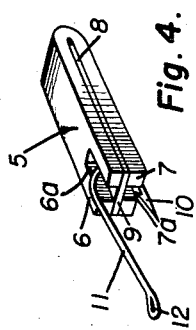
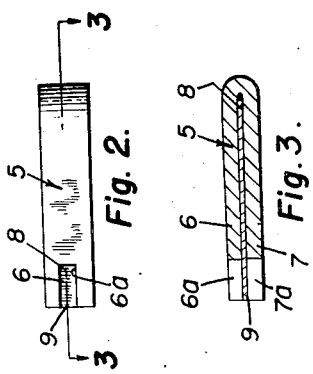
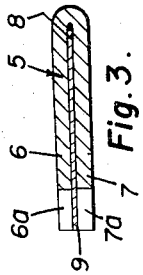
Inventor
Henry L. Oliver
and Mina B. Anderson
By *Clarence A. O'Brien
and Harvey B. Jacobson*
Attorneys Patented Feb. 1, 1949

2,460,526

UNITED STATES PATENT OFFICE 2,460,526

RELEASABLE CASTING WEIGHT

Henry L. Oliver, Durango, Colo., and Mina B. Anderson, Albuquerque, N. Mex.

Application November 20, 1946, Serial No. 711,014

4 Claims. (Cl. 43—27)

This invention relates to new and useful improvements in a releasable casting weight and more particularly to an attachment for releasably securing a sinker or casting weight to a fishing line, whereby the line, bait and casting weight may be cast a considerable distance and said casting weight released from said line upon striking the water.

A feature of this invention is to provide a device of this character that can quickly and easily be placed on the line prior to casting, and which will be automatically released from the line upon striking the water so that the fisherman can play a fish without dragging the weight.

A further feature of this invention is to provide a device of the character referred to that is inexpensive in construction so that the loss of said weight is immaterial to the pleasure gained by use thereof.

A still further feature of this invention is to provide a device of this character that is efficient and reliable in operation, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a schematic view illustrating the use of the invention;

Figure 2 is a plan view of the invention with line attaching means removed;

Figure 3 is a longitudinal sectional view taken on the line 3—3 of Figure 2; and, Figure 4 is a perspective view of the invention attached to a fish hook.

Referring now to the drawing in detail wherein for the purpose of illustration, we have disclosed a preferred embodiment of the invention, the numeral 5 represents a substantially U-shaped weighted body having bifurcated ends 6 and 7. Suitably held between the inner faces of the bifurcated ends of said body 5 is a rectangular strip 8 of suitably frangible material, the outer edge 9 of said strip 8 extending in the plane with the outer bifurcated ends 6 and 7 of said weighted body 5. Each bifurcated end 6 and 7 is also bifurcated as shown at 6a and 7a to form inwardly extending slots to expose a portion of the surface of the strip 8.

The barb end 10 of a fishing hook 11 is placed in the slotted ends 6a and 7a to penetrate through said strip 8 as illustrated clearly in Figure 4.

The eye end 12 of said hook 11 is then suitably attached to the lower end of a fishing line or the like 13 which is carried by the end of a line 14.

The line 14 is cast by the fisherman 15 and said weight 5 carries the line well forward from said fisherman.

Upon contacting the water or by a backwardly exerted pulling motion of the line by the fisherman, the hook 11 is torn through strip 8 and between the bifurcated ends of weighted body and said weighted body is released from the hook.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

We claim:

1. A releasable casting weight comprising a body with an opening at one end thereof, and a tearable strip of material carried by the body over said opening, said tearable strip adapted to receive the barbed end of a fishing hook, and said hook being torn through said strip and away from said body as the line carrying said hook is cast so that the hook contacts a body of water with impact.

2. A releasable casting weight comprising a U-shaped weighted body having bifurcated ends, and a frangible strip of material carried by the body between the bifurcated ends of said body, said frangible strip of material adapted to be engaged by the barbed end of a fishing hook and said hook being torn through said strip and away from the body as the line holding said hook is cast so that the hook contacts a body of water with impact.

3. A releasable casting weight comprising a U-shaped body having bifurcated ends, and a frangible strip of material suitably held between the inner faces of said body, said strip extending between the bifurcated ends of said body and adapted to receive the barb end of a fishing hook, and said hook being torn from the strip as a line to which the hook is attached is cast toward a body of water and strikes the water with impact.

4. A releasable casting weight comprising a strip of material bent upon itself, and a frangible member clamped between the bent ends of the strip, said bent ends of the strip having inwardly extending slots adapted to receive a fish hook for penetrating through the frangible member, and said hook being torn from the frangible member to release the weight upon a predetermined pulling force exerted on the hook.

HENRY L. OLIVER.
     MINA B. ANDERSON

REFERENCES CITED

The following references are of record in the file of this patent:

UNITED STATES PATENTS

| Number | Name | Date |
| --- | --- | --- |
| 1,564,147 | Stickley et al. | Dec. 1, 1925 |
| 1,974,381 | Swanson et al. | Sept. 18, 1934 |
| 2,326,876 | Miller | Aug. 17, 1943 |
| 2,329,117 | Henderson et al. | Sept. 7, 1943 |